UNITED STATES PATENT OFFICE.

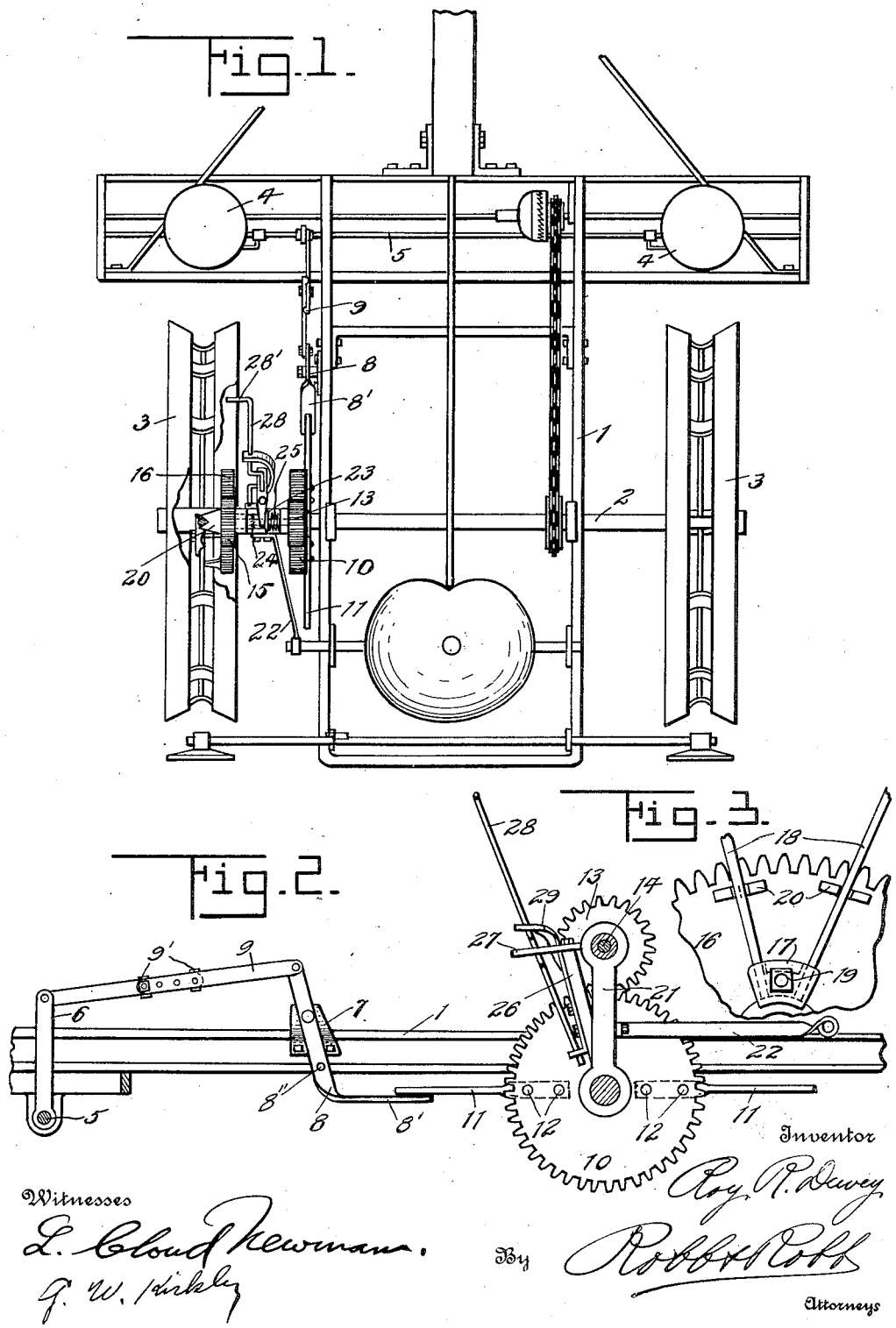

ROY R. DEWEY, OF TRIUMPH, ILLINOIS.

ATTACHMENT FOR CORN-PLANTERS.

1,091,879.     Specification of Letters Patent.     Patented Mar. 31, 1914.

Application filed October 16, 1913. Serial No. 795,548.

*To all whom it may concern:*

Be it known that I, ROY R. DEWEY, a citizen of the United States, residing at Triumph, in the county of La Salle and State of Illinois, have invented certain new and useful Improvements in Attachments for Corn-Planters, of which the following is a specification.

The object of the present invention is to provide a novel attachment particularly adapted for corn planters for operation of the grain hopper valves of the seeding mechanism, and by means of which the grain may be dropped at predetermined intervals.

More specifically my invention is designed for the purpose of eliminating the use of the usual check row wire which effectively performs the same function above mentioned but has numerous disadvantages in actual use.

It is contemplated to employ in coöperation with my tripping attachment, manually operable means for controlling operation of the same.

With the above and other objects in view, this invention consists in the construction, combination and arrangement of parts all as hereinafter more fully described, claimed and illustrated in the accompanying drawings, wherein:

Figure 1 is a top plan view of a corn planter showing my tripping attachment applied thereto. Fig. 2 is an enlarged detail view of the tripping mechanism. Fig. 3 is a fragmentary view showing the manner of attaching the driving gear for the tripping mechanism to the planter wheel.

Throughout the following detail description, and on the several figures of the drawing, similar parts are referred to by like reference characters.

Specifically describing the embodiment of my invention, the numeral 1 represents the frame of a corn planter of the usual type, carried by the driving axle 2 which has secured thereto the ground wheels 3. The forward portion of the frame 1 carries the seeding mechanism comprising the grain hoppers 4 having hopper valves (not shown) which valves are adapted to be operated by the valve shaft or rod 5 extending transversely of the planter frame 1.

Secured to the hopper valve rod 5 adjacent one side of the frame is a vertically disposed arm 6, movement of which arm in either a forward or rearward direction will operate said rod and the hopper valves to drop the grain at intervals in the use of the planter.

At one side of the frame 1 in rear of the seeding mechanism is secured a bracket 7 on which is pivotally mounted an operating lever 8. It will be observed from Fig. 2 of the drawing that the lever 8 is pivoted intermediate its length and is disposed in a substantially vertical position being formed, moreover, with a rearwardly extending portion 8', with which the tripping member, to be described, is adapted to engage to operate the lever intermittently. The upper end of the operating lever 8 is connected to the vertical arm 6 by means of an adjustable link 9, said link being composed, preferably, of two sections connected at 9' for extension purposes.

Upon the axle 2 adjacent one side of the planter frame 1 is loosely mounted a large gear 10 having extending therefrom the tripping arms 11, two of said arms being shown in the drawings, and these arms are preferably secured to the gear in grooves by fastening means 12. Intermeshing with the gear 10 is a pinion 13 disposed above said gear and being carried fixedly by the inner extremity of the shaft 14 extending in parallel relation to the axle 2 and carrying at its opposite end a similar pinion 15 intermeshing with a large gear wheel 16 disposed upon the axle 2. The gear 16 is secured preferably to one of the wheels 3 by means of clamping members 17, shown most clearly in Fig. 3 of the drawing, and which members are disposed on the outer side of the wheel adjacent the hub of the same and each coöperating with a pair of spokes 18, bolts or similar fastening means 19 passing through the gear 16, and said clamping members 17. Adjacent the periphery of the gear are formed notched spoke engaging members 20 which effectively connect the gear to the wheel to withstand the strain which is placed thereupon in actual use.

It will be understood that motion is transmitted from the wheel 3 and gear 16 through the pinions 15 and 14 to the rotatable tripping member comprising the arms 11 and as such arms in their rotation about the shaft 2 contact with the lower bent extremity 8', said lever is actuated and pulls the arm 6 rearwardly through the link member 9 so as to trip the hopper valves for dropping the grain at proper intervals.

It is obvious that the gear 10 may be provided with any suitable number of arms 11 and which arms may be spaced at proper points so as to effectively control the point of deposit of the grain as will be readily understood by those skilled in the art to which this invention relates.

It is desirable in the use of a device of this nature to effectively control the operation of the tripping mechanism and for this purpose I have provided a manual control disposed adjacent the position of the operator and by means of which the operation of the tripping member 10 may be discontinued. As will be noted by reference to Fig. 2 the shaft 14 is mounted in a casting or upright support 21 which is held in its upright position by means of a brace 22 secured to said support and a convenient portion of the planter frame 1. The support 21 is bifurcated at its upper end and between the shaft journals is disposed the clutch member 23 slidable longitudinally on the shaft 14 and adapted to engage the coöperating clutch member 24 formed on and projecting laterally from the pinion 15. The portion of the shaft 14 on which the clutch member 23 is movable is preferably squared and interposed between the clutch member 23 and the adjacent bifurcated journal for the shaft is mounted a spring 25 normally tending to hold the clutch member in engagement with its coöperating clutch member 24. Extending forwardly and mounted pivotally on the upstanding support 26 is disposed a clutch shifting lever 27, its rear bifurcated end engaging about the clutch member 23. The opposite end of the clutch shifting lever 27 is formed with a slot through which passes a rod 28, having at its upper end a handle 28' as will be seen in Fig. 1. The rod 28 is bent laterally where it passes through the clutch shifting lever 27, and said rod is journaled in the bracket 29 both at its lower extremity and at a point above the clutch shifting lever 27 over which the bracket 29 projects.

It will be apparent from the foregoing description that the operator, to discontinue the operation of the tripping mechanism, needs only to turn the rod 28 thereby moving the clutch shifting lever 27 to disengage the clutch member 23 and cause operating disengagement of the pinion 15 with the shaft 14, said pinion being loosely mounted upon the round extremity of said shaft.

The hopper valves are operated by movement of the rod 5 in a direction opposite to that hereinbefore described, in some corn planters of this type. This change of operation is provided for in my attachment by forming an opening 8" in the operating lever 8 beneath its pivot so that it is only necessary to connect the link member 9 at this point whereby actuation of the operating lever by the arms 11 will move the vertical arms 6 forwardly instead of rearwardly as heretofore described.

It will be apparent that the attachment comprising my invention may be easily employed in conjunction with various types of corn planters for performing the operation usually accomplished by means of the check row wire.

Changes may be readily made in the exact form of the several parts of my invention, without departing from the spirit of the same and within the scope of the appended claims.

Having thus described the invention, what I claim as new is:

1. An attachment for corn planters comprising a tripping member, means for operating the tripping member, an operating lever adapted to be engaged by the tripping member, a hopper valve rod, and an adjustable link member adapted for connection above or below the pivot of the operating lever whereby to actuate the valve rod in opposite directions.

2. An attachment for corn planters comprising a tripping member, an operating lever carried by said planter adjacent the tripping member, the operating lever aforesaid having pivotal connection with the planter intermediate its length and formed with an extension with which the tripping member engages, a hopper valve rod, a link member comprising adjustable sections adapted to connect the valve rod with the operating lever at either side of the pivot of the latter, and means for operating the tripping member aforesaid.

In testimony whereof I affix my signature in presence of two witnesses.

ROY R. DEWEY.

Witnesses:
  JOSEPH W. GREGG,
  GEORGE L. HILL.

---

Copies of this patent may be obtained for five cents each, by addressing the "Commissioner of Patents, Washington, D. C."